(No Model.) 3 Sheets—Sheet 2.

A. G. KINYON.
TRIPLE VALVE FOR AIR BRAKE MECHANISM.

No. 601,304. Patented Mar. 29, 1898.

UNITED STATES PATENT OFFICE.

ALONZO G. KINYON, OF ELGIN, ILLINOIS.

TRIPLE VALVE FOR AIR-BRAKE MECHANISM.

SPECIFICATION forming part of Letters Patent No. 601,304, dated March 29, 1898.

Application filed March 8, 1897. Serial No. 626,482. (No model.)

*To all whom it may concern:*

Be it known that I, ALONZO G. KINYON, a citizen of the United States, residing at Elgin, in the county of Kane and State of Illinois, have invented a new and useful Triple Valve for Air-Brake Mechanism, of which the following is a specification.

This invention relates to triple valves for air-brake mechanisms.

The object of the invention is to provide a construction and arrangement of parts in a triple valve whereby the auxiliary reservoir may be speedily recharged after having pressure withdrawn therefrom for use in setting the brakes.

A further object of the invention is to improve, simplify, and increase the efficiency of quick-action automatic triple valves in air-brake mechanism, whereby the operation thereof both in service and also in emergency applications of the brake is facilitated and is speedy, certain, and satisfactory.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the various views and reference-signs appearing thereon, Fig. 3 is a central section of the construction shown in Fig. 1 in a plane at right angles to the plane of said Fig. 1 and on the line Y Y.

The same part is designated by the same reference-sign wherever it occurs throughout the several views.

In air-brake mechanism of the Westinghouse type what is termed in the art a "quick-action automatic triple valve" is suitably connected to the main train-pipe, the auxiliary reservoir, and the brake-cylinder. This valve is operated by variations in pressure in the train-pipe to perform its function of admitting air-pressure from the auxiliary reservoir and under certain conditions of also admitting air-pressure from the train-pipe to the brake-cylinder in order to effect an actuation of the brake. This valve mechanism also serves the purpose of cutting off communication from the brake-cylinder to the auxiliary reservoir and controls the ports through which the auxiliary reservoir is recharged after having the pressure contained therein reduced by drawing off such pressure for service application, and also controls the ports through which the brake-cylinders are opened to exhaust to release the brake.

In the practical use of mechanism of this character and type it will be understood that an auxiliary reservoir and brake-cylinders are mounted on each car of the train, and these several devices on each car throughout the train are in coöperative communication with a train-pipe which extends throughout the entire train, the pressure in such train-pipe being primarily controlled by the engineer. Although the construction and mode of operation of apparatus of this class and type are well understood by persons skilled in the art, I will refer briefly herein to the construction and operation of such apparatus as commonly employed in order to enable a full understanding of the objects had in view by the present invention and the advantageous results secured thereby. In this description I will designate the pressure within the train-pipe and which is primarily controlled by the engineer as the "train-pipe pressure." I will also designate the pressure contained in or emanating from the auxiliary reservoir as the "auxiliary-reservoir pressure." I will also designate the operation of applying the brakes through the sole medium of the auxiliary-reservoir pressure as a "service application," and the operation of admitting train-pipe pressure to the brake-cylinder to effect a setting of the brakes as an "emergency application."

In the Westinghouse construction of triple valve the primary parts comprise a casing having suitable passages, a piston, and a slide-valve arranged in said casing and adapted to control the port-openings of said passages. The piston is so relatively arranged that it has auxiliary-reservoir pressure on one side thereof and train-pipe pressure on the other side thereof, and the slide-valve is suitably coupled to said piston to move therewith, the connection being such that a suitable amount of play or relative movement of such slide-valve and piston is permitted. When the pressure in the train-pipe is moderately reduced, the piston becomes overbalanced by reason of the excess of auxiliary-reservoir pressure over the train-pipe pressure, whereby said piston is moved. The initial movement of such piston first closes the ducts or small port openings or passages through which the air-pressure of the train-pipe is delivered to the auxiliary reservoir. A continued movement of the piston causes the lost motion between the piston and slide-valve to be taken up and at the same time effects an unseating of what is known in the art as the "graduating-valve" and which controls a passage through the slide-valve and which passage eventually opens communication between the auxiliary reservoir and the brake-cylinder. At the time the graduating-valve is unseated, however, the passage which it controls is in open communication with only the auxiliary reservoir, the other end of said passage being closed by the seat of the slide-valve. After the piston has moved a sufficient distance to cause the graduating-valve to be unseated, said valve being connected to move with said piston and also to take up the lost motion between said piston and slide-valve, then and upon continued movement of said piston the piston and slide-valve move in unison, thereby moving the slide-valve into position for the passage therethrough and which was originally closed by the graduating-valve to be uncovered by being brought into communication with a passage leading to the brake-cylinder. Thus communication is established between the auxiliary reservoir and the brake-cylinder, admitting pressure from the former to the latter and hence effecting a setting of the brakes. At this stage of the movement of the piston of the triple valve a spring is encountered by the end of such piston, which arrests its further movement, it being remembered that the operation so far described is secured through only a moderate reduction of train-pipe pressure. Now the engineer suitably operates the valve which controls the train-pipe pressure to prevent further reduction of train-pipe pressure. The first effect of this is to cause a surging of the air through the train-pipe and its triple-valve connections in the opposite direction. This surging effect, together with the lowering of pressure in the auxiliary reservoir, is due to the supplying of pressure therefrom to the brake-cylinders for service application, imparting to the piston of the triple valve a backward movement sufficient to take up the lost motion between such piston and the slide-valve. This movement effects a seating of the graduating-valve, thereby cutting off further supply of pressure to the brake-cylinder from the auxiliary reservoir. Further backward movement of the piston is prevented by reason of the friction of the slide-valve in its seat. The parts now remain in this position with the brakes set until further action is taken by the engineer. Such further action may be had with a view to setting the brakes harder by again reducing the train-pipe pressure, thereby practically repeating the above operation to the extent of again unseating the graduating-valve, the passage controlled thereby being already in communication with the auxiliary reservoir and the brake-cylinder or with a view to releasing the brakes. This latter result is effected by the engineer suitably manipulating his controlling-valve to increase the train-pipe pressure, whereby the piston becomes overbalanced by excess of train-pipe pressure over the auxiliary-reservoir pressure, thereby effecting a return of the piston and with it the slide-valve to their initial or normal positions and causing the brake-cylinder to be opened to exhaust and the triple-valve piston to be moved to position to again establish communication between the train-pipe and the auxiliary reservoir by again opening the small ducts or passages controlled by said pistons. These ducts or grooves are formed in the extreme end of the cylinder in which said piston operates, and herein resides the material point of improvement of my invention over the prior art as above outlined.

I have found in practice that after the air-pressure in the auxiliary reservoir has been reduced by drawing off therefrom for use in setting the brakes considerable time is consumed in recharging the auxiliary reservoir from the train-pipe through the ducts or grooves referred to, by reason of the fact that such grooves or ducts must necessarily be small. This is necessary in order to prevent equalization of pressure on opposite sides of the piston through such ducts or grooves when the train-pipe pressure is reduced, and by reason of their comparatively small area it takes considerable time to recharge the auxiliary reservoir. This consumption of time in recharging the auxiliary reservoirs throughout the train is objectionable and may often prove dangerous to life, limb, and property by reason of the fact that immediately after a setting of the brakes and their release it may be desired to again reset them. This cannot be done effectively with the reduced pressure in the auxiliary reservoir and which has not been restored, a sufficient length of time not having elapsed between the previous setting of the brakes and consequent reduction of auxiliary-reservoir pressure and the resetting of the brakes to enable the train-pipe pressure to leak through these small ducts or passages to the auxiliary reservoir. Therefore the primary object of my invention is to provide an automatic quick-action triple valve which will rapidly and almost instantaneously recharge the auxiliary reservoir after a reduction of pressure therein and in which the recharging-passage is not limited in size or area.

I will now refer briefly to the emergency application of the brakes of the prior art, similarly pointing out my present improvement thereon.

If it is desired to suddenly and quickly apply the brakes with all the force or power at command, the engineer suitably manipulates his control-valve to cause a sudden or violent reduction of train-pipe pressure. The result is to cause the piston of the triple valve to move quickly from its normal or initial position and to perform the several operations above described and to finally engage the spring above referred to and to compress the same. This permits a further travel of the piston, and hence also of the slide-valve, than in the before-described operation, thereby causing the said valve to be moved into a position such as to open communication between the auxiliary reservoir and a supplemental chamber in which is a piston and valve, which latter controls a passage communicating directly between the train-pipe and the brake-cylinder. The pressure of air from the auxiliary reservoir on said supplemental piston causes said valve to be unseated, and hence establishes such communication between the brake-cylinder and train-pipe, and hence augments the auxiliary-reservoir pressure introduced to the brake-cylinder by the train-pipe pressure thus introduced. This action of admitting train-pipe pressure to the brake-cylinder on each car also serves to still further reduce the train-pipe pressure in the connection to the next succeeding car of the train, and so on throughout the entire length of train, thereby securing practically a simultaneous braking throughout the entire length of the train. I have found in practice that this construction and arrangement is open to objection, for the reason that after use for any length of time the springs referred to lose their strength and efficiency, and hence detracts from the efficiency of the apparatus. Moreover, it is exceedingly difficult to secure absolute uniformity of tension of the springs throughout an entire train, and especially as it is impracticable to so make up trains that all the triple valves on all the cars shall have seen the same length of service, and hence if the springs employed should be of uniform strength at the time of their manufacture they may have been in service for a varying length of time, and hence be of varying stength, and it is evident that should the spring of just one triple valve throughout an entire train be weakened unduly by continued service to a point where the piston of that valve is permitted to travel in a service application of the brakes sufficient to effect an emergency application of the brake on that particular car the entire train is affected injuriously. It is therefore the purpose of my present invention to avoid these defects which service practice has demonstrated to exist and to provide a construction and arrangement which will be uniform throughout the entire train without regard to the previous length of service of each valve and wherein the use of springs is avoided and entirely dispensed with. At the same time it is my object to provide an arrangement and construction of triple valve which is simple, thoroughly efficient, and cheap and economical in initial cost of manufacture as well as in repairs.

I will now set forth the construction and arrangement of my invention, the foregoing description serving to explain the mode of operation, the function, and the result accomplished thereby.

In carrying my invention into practical form I provide a casing of three parts A, B, and C, suitably bolted together, the part A containing the parts controlling the admission of train-pipe pressure to the brake-cylinder in the emergency application, as above explained, and also containing the passage through which pressure is supplied to the auxiliary reservoir, as will be more fully hereinafter explained.

The part B of the casing contains what I shall designate the "controlling-plate" and also the train-pipe connection and various channels leading therefrom, all as will presently be more fully explained. The part C contains the rotary valves and various passages controlled thereby and communication between the train-pipe, the auxiliary reservoir, the brake-cylinder, and to the atmosphere, as will hereinafter more fully appear.

Figure 4:
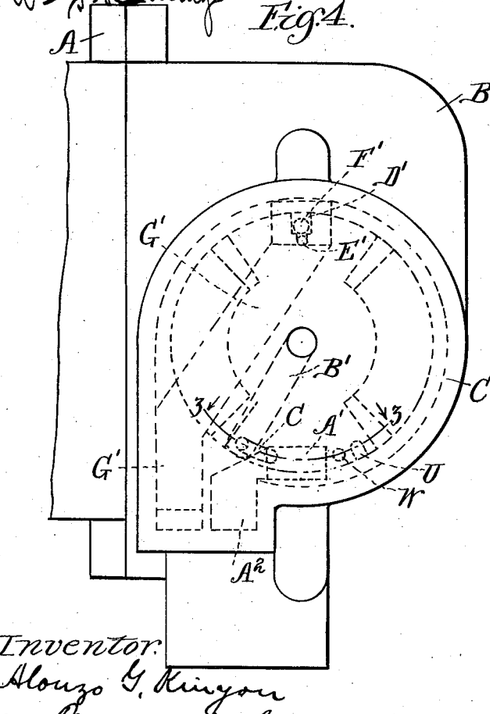
Fig. 4 is a view in side elevation of the right-hand end of the valve-casing, showing in dotted lines the various ports and passages for controlling the course of the pressure.
Figures 5, 6, 7, 8, 9, 10:
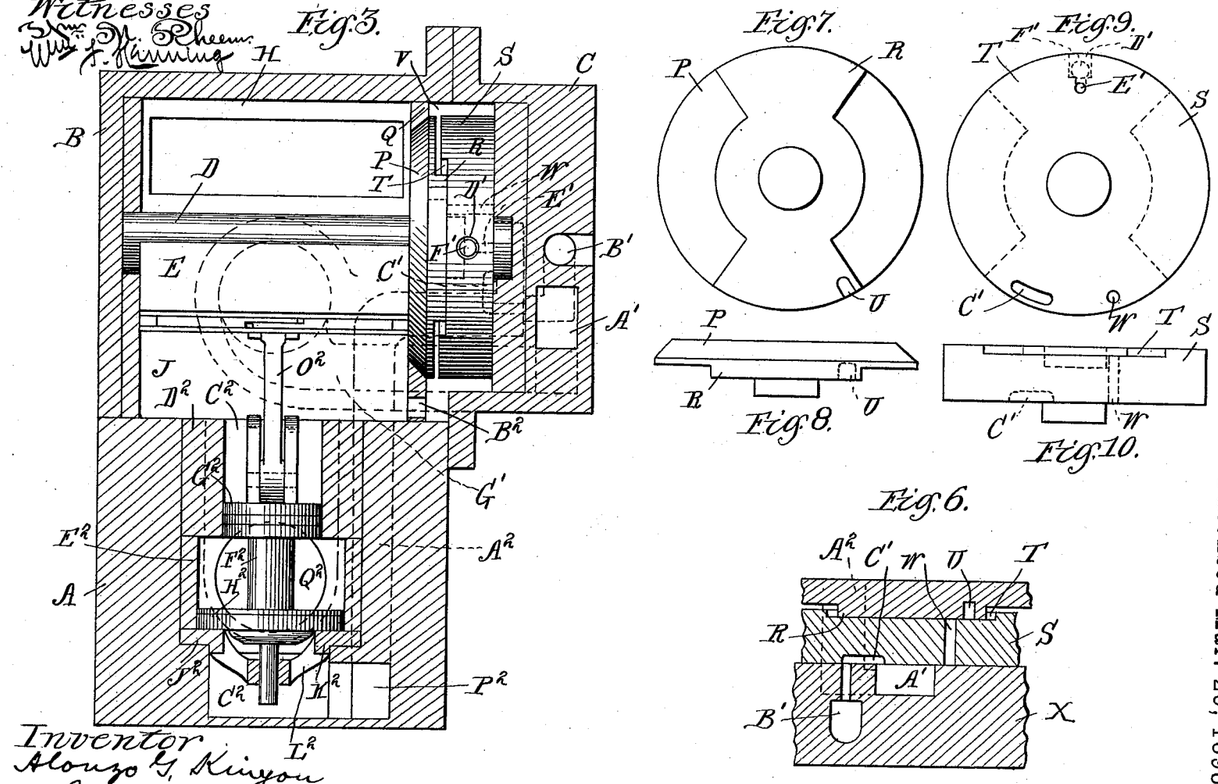
Fig. 5 is a view similar to Fig. 2 and taken in the same plane, but looking in a direction opposite to that in which the arrows point on the line *x x*, Fig. 1.
Fig. 6 is a broken sectional detail view taken on the line *z z*, Fig. 4, looking in the direction of the arrows and showing the relative location of the various controlling ports, passages, and port-disks.
Fig. 7 is a face view of the inner valve-disk.
Fig. 8 is an edge view of the same.
Fig. 9 is a view similar to Fig. 7 of the coöperating disk.
Fig. 10 is an edge view of the same.
Figure 5:
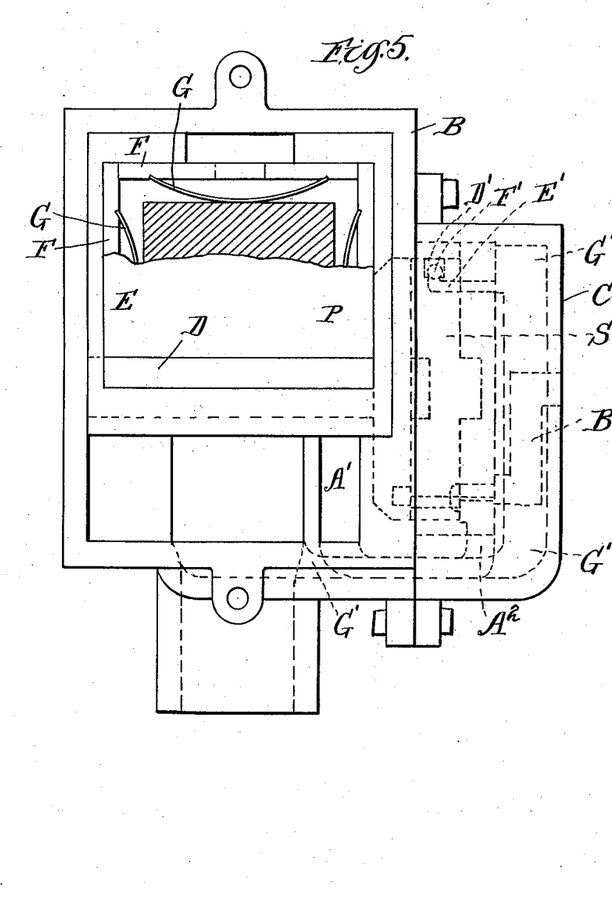

Suitably journaled in the part B of the casing is a shaft D, in or upon which is suitably mounted to rock therewith the controlling-plate E, having suitable packing-strips F, mounted in slots in the edges thereof and normally pressed outwardly by means of suitable springs G, so as to make an air-tight joint between said plate and the walls of the casing B. This plate forms practically a movable partition in said casing, thereby dividing this part B of the casing into the chambers H J, and the shaft D is suitably journaled or mounted in a permanent or stationary partition K, which separates the chambers H J from a third chamber L, Fig. 1, an opening M being formed in said partition-wall K, opening communication between chambers H and L. The chamber J is in free communication, through passage N in part A of the casing, with the auxiliary reservoir, and chamber L communicates freely through passage O with the train-pipe. From this it will be seen that the control-plate E forms a movable division-wall between the auxiliary reservoir and the train-pipe, and hence, being mounted to rock on or with shaft D, is responsive to variations in the train-pipe and auxiliary-reservoir pressures, thereby effecting upon such variations a suitable rocking of shaft D. Said shaft is arranged to extend into part C of the casing and has mounted thereon to rotate therewith a rotary or oscillating valve P. This valve is arranged to be received in a seat Q, formed in the division-wall separating parts B and C of the casing, and forms an air-tight portion of such division-wall. On the face of valve P, which is presented toward the part C of the casing and which I shall designate the "outer" face of such valve, is formed an extended projecting rib, (indicated at R, Figs. 3, 6, 7, and 8,) and loosely mounted on the end of shaft D and in proximity to valve R is a similar disk or rotary valve S, having on the face thereof, presented toward valve P and which I shall designate the "inner" face of such valve, a recess or seat (indicated at T) adapted to receive the projecting rib R, the said recess or seat T being of a size sufficiently larger than the projecting rib to permit of a desirable relative rotary motion of valve P without effecting a rotary movement of said valve S. In other words, the engagement or reception of projection R in seat T forms in effect a loose coupling, by which said disk valve S is coupled to rotate with shaft D, the construction and arrangement being such that when the shaft D is rotated or rocked, carrying with it the valve P, said valve is permitted a desirable range of movement before the sides of projecting rib R engage the walls of recess T to effect a coincident rocking of said valve P during the remainder of the rocking movement of the shaft. At a suitable point in the outer face of valve P, I provide a pocket or passage U, which does not extend through such valve, but which is in constant communication with the chamber V, in which said valves P S are arranged. The valve S has formed therethrough a port or passage W, which during certain relative movements of said valves, presently to be described more fully, is brought into register with the pocket or passage U. The outer face of valve S is arranged to bear against a backing X, which may be the solid wall of part C of the casing, or, if desired and as shown, against an interposed solid disk or washer as a seat, and said backing or seat is provided with suitably-cored passages A' B', the passage or port W through said valve S adapted during certain movements or portions of movements thereof to be brought into register or communication with said passage A', and a groove or recess C', formed in the outer face of valve S', being arranged to open or establish communication between the passages A' B', as will presently be more fully explained. In the periphery of valve S is formed a recess D', with which communicates a passage or port E', extending from the outer face of such valve. A valve F', preferably in the form of a ball, is arranged to be received in the seat or recess D' and controls the said passage E'. A passage G', formed in the backing or seat of valve S or in the wall of casing C, communicates at one end with the chamber L of part B of the casing, and at the other end said passage delivers into and through the passage or port opening E' in said valve to the recess D' and thence into chamber V, when said valve is actuated to bring said port or passage E' into register with said passage G'. The passage A' communicates, through a suitable coöperating passage A², with the brake-cylinder, and passage B' communicates with the atmosphere, as clearly shown in Figs. 3 and 4, and chamber V communicates, through passage B², with chamber J, and thence, through passage N, with the auxiliary reservoir.

From the foregoing description the operation of the parts so far described will be readily seen and understood. Air-pressure is supplied to the triple valve through the train-pipe passage O and immediately fills the chambers L and H. I will now suppose that the auxiliary reservoir has become charged to the point where pressure on opposite sides of control-plate E is equalized, and the parts are in their normal position under such condition—that is, the brakes are released and the ports or passages A', B', C', W, and U in the relative positions shown in Figs. 4 and 6. Now suppose it is desired to effect a service application of the brakes. The train-pipe pressure is moderately reduced by the engineer suitably manipulating the control-valve, thereby reducing the pressure in chamber H, which is train-pipe pressure, below that of chamber J, which is auxiliary-reservoir pressure, hence causing plate E to be rocked, thereby effecting a rocking of shaft D. This causes valve P to be rocked to first take up the lost motion between said valve and valve S and to bring the pocket U into register with port W. At this time, however, the other end of said port W is closed by the backing X, as clearly shown in Fig. 6. Continued rotation of shaft D, carrying with it the rocking or rotary valve P, after the lost motion between said valve P and valve S has been taken up, effects a rocking or rotary movement of said valve S, thereby carrying the port E' out of register with passage G' and also the groove or passage C' out of register with passage A' in the backing X and bringing the port W into register with said passage A'. Thereupon the following operation takes place: Air-pressure passes from the auxiliary reservoir through passage N, chamber J, passage B², Fig. 3, space or chamber V, pocket U, port W, passage A', passage A², and thence to the brake-cylinder, thereby effecting a setting of the brake. When the engineer so manipulates the control-valve as to cease the reduction of train-pipe pressure without restoring any pressure therein, the effect is to cause a temporary backward surging or impulse of the pressure throughout the train-pipe and its connections, as before explained, which surging causes the control-plate, and with it shaft D, to rock a limited extent in a direction opposite to that in which these parts rocked in the foregoing description. By reason of the lost motion between valves P and S this reverse movement of valve P, due to the backward surging or impulse referred to, does not effect a movement of said valve S, but is sufficient to carry the pocket U out of register with port W, thereby cutting off further supply of pressure from the auxiliary reservoir to the brake-cylinder. The parts are now in position to be restored to their normal position or else for a further admission of auxiliary-reservoir pressure to the brake-cylinder, as the exigencies of the case may demand, and such further action is controlled by the engineer through the manipulation of the engineer's control-valve. If it is desired to set the brakes harder, the engineer again reduces the train-pipe pressure sufficiently for the valve P to be rocked back through the limit of its lost motion or play with respect to valve S, thereby again bringing pocket U into register with port W, whereupon communication is again established between the auxiliary reservoir and the brake-cylinder. If, however, it is desired to release the brakes and to restore the parts to their normal positions, the engineer manipulates his control-valve to again supply pressure to the train-pipe and its triple-valve connections. This action causes the pressure in chamber H to exceed that in chamber J, thereby rocking the plate E back to its initial position, and hence also rocking shaft D and valve P. The initial rocking of said valve carries pocket U out of register with port W, thereby cutting off communication between the auxiliary reservoir and the brake-cylinder. Further or continued rocking of said valve P causes the projection therefrom to engage the walls of the recess in valve S, thereby effecting a coincident rocking of said valve S, thereby carrying port W out of register with passage A', bringing port E' again into register with passage G', and establishing communication through groove or port C' between passages A' and B'. Thereupon the following action takes place: Air-pressure passes from the train-pipe to chambers L and H of the triple-valve casing, thence through passage G', port E', lifts the ball-valve F', enters recess D', thence passes to chamber V, and thence through passage B² to chamber J and through passage N to the auxiliary reservoir, thereby recharging said reservoir, until finally the pressures on opposite sides of control-plate E—namely, the train-pipe pressure and the auxiliary-reservoir pressure— are equalized, when the ball-valve F' will fall by gravity to its seat, thereby closing the line of communication between the train-pipe and the auxiliary reservoir. While this action is taking place the brakes are released by the air-pressure in the brake-cylinder exhausting through passage A², passage A', port C', and passage B' to atmosphere. The parts are now in their initial or normal position ready for another service or an emergency application of the brakes.

By the arrangement above described I am enabled to employ air-passages from the train-pipe to the auxiliary reservoir of any desired area—that is to say, the size or area of the passage G', the port E', recess D', chamber or space V, or passages B² or V is not limited by any danger of equalizing the train-pipe and auxiliary pressures therethrough without effecting the desired operation of the control-plate E, and by making these several passages and ports of suitable area I am enabled to greatly decrease the time required to recharge the auxiliary reservoir therethrough. This is a most important feature of my invention, for the reason that in the prior or Westinghouse system of air-brake mechanism, as above pointed out, the recharging of the auxiliary reservoir consumes considerable time, and it may frequently happen that immediately after drawing off pressure from the auxiliary reservoir for service application of the brakes and before sufficient time has elapsed for the auxiliary reservoir to be recharged by a restoration of the parts to their initial or normal positions it is desired to reset the brakes. Such result cannot be efficiently accomplished to the extent of utilizing in the brake-cylinders the desired or a desirable amount of pressure by reason of the previous reduction of pressure in the auxiliary reservoir, and hence serious or fatal accidents might occur by reason of the inability to set the brakes with sufficient force. Such result is wholly avoided in my construction, for the reason that the passages establishing the line of communication from the train-pipe to the auxiliary reservoir and through which the auxiliary reservoir is recharged when the parts are in their normal or initial position are not limited in area, and almost instantly after this line of communication is opened up by a restoration of the parts to their normal or initial position the auxiliary reservoir is recharged, no appreciable interval of time being consumed in the recharging thereof.

Figure 1:
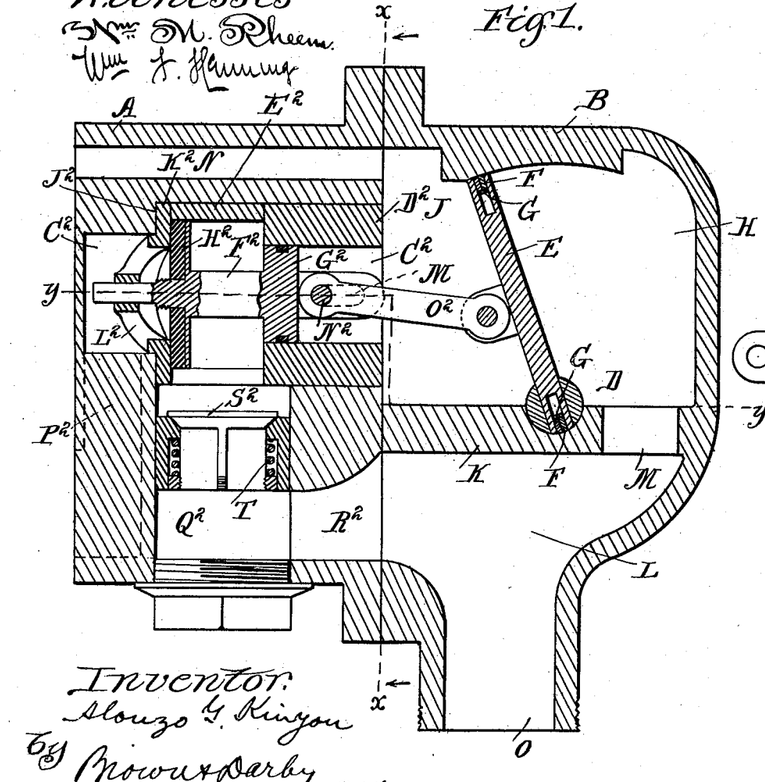
Figure 1 is a view in central section of a triple valve embodying the principles of my invention.
Figure 2:
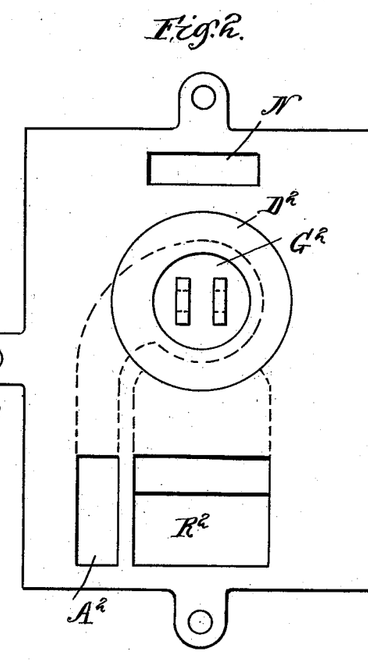
Fig. 2 is a view in end elevation of the left-hand side or portion of the mechanism in the plane *x x*, Fig. 1, looking in the direction of the arrows.

I will now describe the construction and arrangement for effecting an emergency application of the brakes—that is, for opening the brake-cylinder directly to the train-pipe—particular reference being had to Figs. 1, 2, and 3.

The part A of the casing of the triple valve has formed therein a chamber $C^2$, in which is arranged a rod $F^2$, carrying the pistons or plungers $G^2$ $H^2$, spaced a suitable distance apart. The piston $H^2$ is of larger diameter than piston $G^2$, whereby when pressure is admitted to the space between such pistons the increased area of piston $H^2$ causes said pistons to be normally held in one limit of the travel of the piston-rod $F^2$, upon which said pistons are mounted. In other words, I provide an unbalanced piston arrangement. If desired, the difference in relative sizes or areas of the pistons $G^2$ $H^2$ may be accommodated so as to leave an air-tight space between them by inserting in the chamber $C^2$ the sleeves $D^2$ $E^2$, respectively, having internal diameters of a relative length to form cylinders in which said pistons $G^2$ $H^2$, respectively, operate.

The chamber $C^2$ is provided with an offset shoulder $J^2$, adapted to receive the flange $K^2$ of a spider $L^2$, adapted to receive and form a guide for the end of the piston-rod $F^2$. The piston $H^2$ may, if desired, be rubber-faced, as shown, on the side thereof which finds a seat against the spider-flange $K^2$. The piston $G^2$ plays freely back and forth in the cylindrical opening of sleeve $D^2$. The inner end of the piston-rod $F^2$ is slotted, as indicated at $M^2$, in which slot is adapted to be received a projection or pin $N^2$, carried by a link $O^2$, said link being connected at its opposite end to the control-plate E. The piston $H^2$ when in its normal or initial position, as shown in Figs. 1 and 3, forms, with the flange $K^2$, a valve to prevent the escape of pressure from the space inclosed by said pistons $G^2$ $H^2$, and hence cutting off communication between said space and the chamber $C^2$ proper, the outer end or portion of which chamber is in free communication through passage $P^2$ with the brake-cylinder. The part A of the casing is also provided with a chamber $Q^2$, which opens into the space between the pistons $G^2$ $H^2$ and which also communicates freely through passage $R^2$ with the chamber L of the part B of the casing, and which chamber is in free communication with the train-pipe. A valve $S^2$, arranged to open toward the space inclosed by pistons $G^2$ $H^2$, is mounted in chamber $Q^2$ and controls the communication between said chamber and space, said valve being normally held to its seat, thereby closing said communication, by means of the pressure contained in the space referred to, and, if desired, by any suitable auxiliary devices—such, for instance, as a spring $T^2$.

The operation of this feature of my invention is as follows: It will be remembered that in the description of the construction and arrangement of parts for securing a service application of the brakes only a moderate reduction of train-pipe pressure was made, and the movements resulting therefrom of control-plate E are permitted by elongating the slot $M^2$, as shown, in the inner end of the piston-rod $F^2$ without effecting any movement of the pistons $G^2$ $H^2$. If, however, it is desired, through the exigency of actual service, to set the brakes hard, the engineer suitably actuates his control-valve to effect a sudden and violent reduction of pressure in the train-pipe. This action causes the auxiliary-reservoir pressure in chamber J to greatly overbalance the train-pipe pressure in chamber H, and hence the control-plate E is rocked under such excess of pressure to an extent sufficient to cause the projection or pin $N^2$ to traverse the length of elongated slot $M^2$, and thereafter to effect an endwise movement of piston $F^2$, carrying with it pistons $G^2$ $H^2$, and hence effecting an unseating of the piston $H^2$ as a valve, thereby establishing a communication between the space inclosed by said pistons and the passage $P^2$ leading to the brake-cylinder. Thereupon the excess of train-pipe pressure upon the under side of valve $S^2$, the pressure of air confined in the space above such valve being relieved by the unseating of the valve-piston $H^2$, causes said valve to be unseated, thereby establishing a free passage from the train-pipe to the brake-cylinder, and hence an actuation of the brakes. The use of train-pipe pressure thus introduced to the brake-cylinder on one car serves to aid in the general reduction of train-pipe pressure effected by the before-mentioned manipulation of the engineer's control-valve, and hence aids in securing a more rapid emergency application of the brakes on the next succeeding car of the train, and so on throughout the entire length of the train. The movements of the valves P and S during the emergency application are such that the pressure from the auxiliary reservoir is also admitted to the brake-cylinder, and such pressure is augmented by the train-pipe pressure to effect an actuation of the brakes during an emergency application. By again supplying increased pressure to the train-pipe in order to release the brakes after an emergency application the control-plate E is again rocked back to its normal or initial position, thereby again causing piston $H^2$ to seat, thus confining air in the space between the pistons $G^2$ $H^2$, and hence permitting valve $S^2$ to be seated. The excess of area of piston $H^2$ over that of piston $G^2$, together with the auxiliary-reservoir pressure on the other face of piston $G^2$, causes said piston $H^2$ to be held firmly to its seat.

The purpose of providing the piston $H^2$ of greater area than piston $G^2$ is to avoid danger of an emergency application of the brakes during the operation of the apparatus in a service application. In other words, one face of valve $G^2$ is exposed to train-pipe pressure and the other face to auxiliary-reservoir pressure. Now in a service application the train-pipe pressure is moderately reduced, and hence the auxiliary-reservoir pressure, which occupies the space between control-plate E and piston $G^2$, operates to rock said plate and causing the pin $N^2$ to ride to the extremity of slot M. Movement of piston $G^2$ coincident thereafter with plate E is opposed by auxiliary-reservoir pressure on one side of piston $G^2$ and the friction of said piston against the inner walls of the cylinder in which it moves. By making the piston $H^2$ of larger area than piston $G^2$ there is added a resistance to such movement the excess of train-pipe pressure on the larger surface of piston $H^2$ over that on the opposed smaller face or surface of piston $G^2$.

Thus it will be seen that I do not employ resisting-springs for control-plate E, and which in a short term of use rapidly deteriorate, and hence I avoid all danger of effecting an emergency application of the brakes on one or more of the cars of a train during only a service application of others, and this highly objectionable feature is avoided by securing absolute uniformity throughout the entire train without regard to length of service of the triple valves of individual cars.

By the use of a triple valve constructed in accordance with the principles of my invention I avoid the necessity of providing retaining-valves and their connections, through which the brake-cylinder exhausts and which are now commonly employed for use in going down long hills or grades where the brakes are required to be set for a considerable length of time to retain pressure in the brake-cylinder to prevent releasing the brakes until the auxiliary reservoir has been recharged. In my arrangement I have found that the auxiliary reservoir recharges instantly when the engineer moves his control-valve to release position, and hence before a sufficient time has elapsed for the brakes to be released by the brake-cylinder exhausting, and after the auxiliary reservoir is recharged the control-valve may be immediately actuated again in order to open the auxiliary reservoir to the brake-cylinder, and this operation occurs before the brake-cylinder sufficiently exhausts to release the brakes. Thus I materially decrease the cost of the equipment.

Of course it is evident that the feature of securing a rapid recharging of the auxiliary reservoir is not confined to the exact construction and arrangement shown and described, as many changes and variations for securing the desired object would readily suggest themselves to persons skilled in the art and still fall within the spirit and scope of my invention. In like manner many changes and variations in the construction and arrangement of parts for effecting an emergency application of the brakes would readily suggest themselves to persons skilled in the art and still fall within the spirit and scope of my invention. I do not desire, therefore, to be limited or restricted to the exact details of construction and arrangement shown and described; but, Having now set forth the object and nature of my invention and a form of apparatus embodying the same, and having described the construction, function, and mode of operation of such apparatus, what I claim as new and useful, and desire to secure by Letters Patent, is—

1. In an air-brake mechanism, a triple-valve casing connected respectively to the train-pipe, an auxiliary reservoir and a brake-cylinder, and having an independent passage communicating between the train-pipe and the auxiliary reservoir for recharging the latter, a valve arranged to control said passage, and means independent of said valve for automatically opening and closing said passage, an oscillating partition-wall in said casing and connections between said wall and said means for actuating the latter from the former, as and for the purpose set forth.

2. In an air-brake mechanism, a triple-valve casing connected respectively with the train-pipe, the auxiliary reservoir and the brake-cylinder, an auxiliary passage formed in said casing and communicating between the train-pipe and the auxiliary reservoir, a movable partition-wall arranged in said casing between the auxiliary-reservoir connection and the train-pipe connection, and rotary valves actuated by the movements of said partition-wall for controlling said auxiliary passage, as and for the purpose set forth.

3. In an air-brake mechanism, a triple-valve casing connected respectively with the train-pipe, the auxiliary reservoir and the brake-cylinder, and having passages for establishing communication between said several connections, an oscillating partition-wall between said auxiliary reservoir and said train-pipe connections, a rock-shaft upon which said partition-wall is mounted, said shaft actuated by the oscillations of said wall, and means actuated by the rocking of said shaft for controlling said passages, as and for the purpose set forth.

4. In an air-brake mechanism, a triple-valve casing connected respectively with the train-pipe, the auxiliary reservoir and the brake-cylinder, and having passages for establishing communication between said several connections, a rock-shaft mounted in said casing, an oscillating plate carried by said shaft, said plate forming a movable air-tight partition-wall between said train-pipe and auxiliary-reservoir connections, and valves actuated by the rocking of said shaft for controlling said passages, as and for the purpose set forth.

5. In an air-brake mechanism, a triple-valve casing connected respectively with the train-pipe, the auxiliary reservoir and the brake-cylinder, and having passages for establishing communication between said several connections, a rock-shaft mounted in said casing, a plate mounted to oscillate with said shaft and forming a movable air-tight partition between said train-pipe and auxiliary-reservoir connections, a valve also mounted on to rotate with said shaft, a second valve loosely mounted on said shaft, means for engaging said valves to move together, said valves provided with ports and adapted to control said several passages, as and for the purpose set forth.

6. In an air-brake mechanism, a triple-valve casing connected respectively with the train-pipe, the auxiliary reservoir and the brake-cylinder, passages for establishing communication between said several connections, rotary valves for controlling said passages, a rock-shaft for actuating said valves, and means mounted on said shaft and actuated by variations in the train-pipe pressure for directly rocking said shaft, as and for the purpose set forth.

7. In an air-brake mechanism, a triple-valve casing connected respectively to the train-pipe, the auxiliary reservoir and the brake-cylinder, passages for establishing communication between said several connections, a rock-shaft mounted in said casing, a rotary disk mounted thereon to rock therewith, a second rotary disk loosely mounted thereon and adapted to be engaged by said rigidly-mounted disk, said disks having port-openings adapted to control said passages, and means actuated by variations in the train-pipe pressure for rocking said shaft, as and for the purpose set forth.

8. In an air-brake mechanism, a triple-valve casing having a chamber in free communication with the auxiliary reservoir and a passage delivering from the train-pipe to said chamber, a rotary valve arranged in said chamber and adapted to control said passage, an auxiliary valve arranged in said passage and means actuated by variations in the train-pipe pressure for rotating said rotary valve, as and for the purpose set forth.

9. In an air-brake mechanism, a triple-valve casing having a chamber in free communication with the auxiliary reservoir, and a passage delivering from the train-pipe to said chamber, a valve having a port for controlling said passage, and a gravity-valve arranged in said port, as and for the purpose set forth.

10. In an air-brake mechanism, a triple-valve casing having a chamber in free communication with the auxiliary reservoir, and a passage delivering from the train-pipe to said chamber, a rotary valve arranged in said chamber and having a port-opening delivering into said chamber and adapted, when said valve is rotated, to be brought into register with said passage, a gravity-valve arranged in said port, and means actuated by variations in the train-pipe pressure for rotating said first-mentioned valve, as and for the purpose set forth.

11. In an air-brake mechanism, a triple-valve casing having passages communicating respectively with the train-pipe, the auxiliary reservoir, the brake-cylinder and the atmosphere, a rock-shaft mounted in said casing, a rotary disk loosely mounted thereon and provided with a depression or seat in the face thereof, a second rotary disk mounted on to rotate with said shaft and provided with a projection adapted to be received in said seat, said disks provided with port-openings for controlling said passages, and means actuated by variations in the train-pipe pressure for rotating said shaft, as and for the purpose set forth.

12. In an air-brake mechanism, a triple-valve casing having passages communicating respectively with the train-pipe, the auxiliary reservoir, the brake-cylinder and the atmosphere, a pair of coöperating rotary disks having ports for controlling said passages, means for providing lost motion between said disks, and means actuated by variations in the train-pipe pressure for rotating said disks, as and for the purpose set forth.

13. In an air-brake mechanism, a triple-valve casing having passages communicating respectively with the train-pipe, the auxiliary reservoir, the brake-cylinder and the atmosphere, a rock-shaft, a pair of rotary disks mounted thereon and having ports for controlling said passages, one of said disks being loosely mounted on said shaft and provided with a recess in the face thereof, and the other of said disks rigidly mounted on said shaft and provided with a projection adapted to be received in said recess, said projection being of smaller dimension than said recess, and means actuated by variations in the train-pipe pressure for rocking said shaft, as and for the purpose set forth.

14. In an air-brake mechanism, a triple-valve casing having a chamber therein in communication with the brake-cylinder, a piston-rod mounted therein and carrying pistons of varying areas, a passage delivering from the train-pipe to the space between said pistons, and means actuated by a sudden or violent decrease of pressure in the train-pipe for moving said piston-rod whereby said passage is opened to the brake-cylinder, as and for the purpose set forth.

15. In an air-brake mechanism, a triple-valve casing having a chamber in communication with the brake-cylinder, a piston-rod mounted therein and carrying pistons of different areas, the piston of larger area forming a valve for closing the connection between said chamber and the brake-cylinder, a passage opening communication between the train-pipe and the space between said pistons, and means actuated by a violent decrease of train-pipe pressure for moving said pistons whereby said piston-valve is unseated and direct communication is established between the train-pipe and the brake-cylinder, as and for the purpose set forth.

16. In an air-brake mechanism, a triple-valve casing having a chamber in communication with the brake-cylinder, a piston-rod mounted therein having a pair of pistons of unequal area, the piston of larger area forming a valve for closing the communication between said chamber and the brake-cylinder, a passage delivering from the train-pipe to the space between said pistons, a check-valve arranged in said passage and means actuated by a violent decrease in train-pipe pressure for moving said pistons, whereby direct communication between the train-pipe and brake-cylinder is established, as and for the purpose set forth.

17. In an air-brake mechanism, a triple-valve casing having a chamber communicating with the brake-cylinder, a piston-rod mounted therein and carrying pistons of unequal area, a passage delivering from the train-pipe to the space between said pistons, one of said pistons controlling the communication between said brake-cylinder and chamber, and the other piston opposed by auxiliary-reservoir pressure, a movable plate adapted to be actuated by variations in the train-pipe pressure, and a link connecting said plate and piston-rod, as and for the purpose set forth.

18. In an air-brake mechanism, a triple-valve casing having a chamber communicating with the brake-cylinder, a piston-rod mounted therein, and provided with an elongated slot in the inner end thereof, pistons of unequal area mounted on said rod, a passage delivering from the train-pipe to the space between said pistons, a movable plate adapted to be actuated by variations in the train-pipe pressure, and a link connected at one end to said plate and at the other engaging in the elongated slot of said piston-rod, whereby said plate is permitted a range of movement without effecting a movement of said piston-rod but a movement of such plate beyond such range effects a movement of such rod thereby establishing communication between the train-pipe and the brake-cylinder, as and for the purpose set forth.

In witness whereof I have hereunto set my hand, this 4th of March, 1897, in the presence of the subscribing witnesses.

ALONZO G. KINYON.

Attest:
J. H. WILLIAMS,
GEORGE H. MCDONALD.